Figure 1:
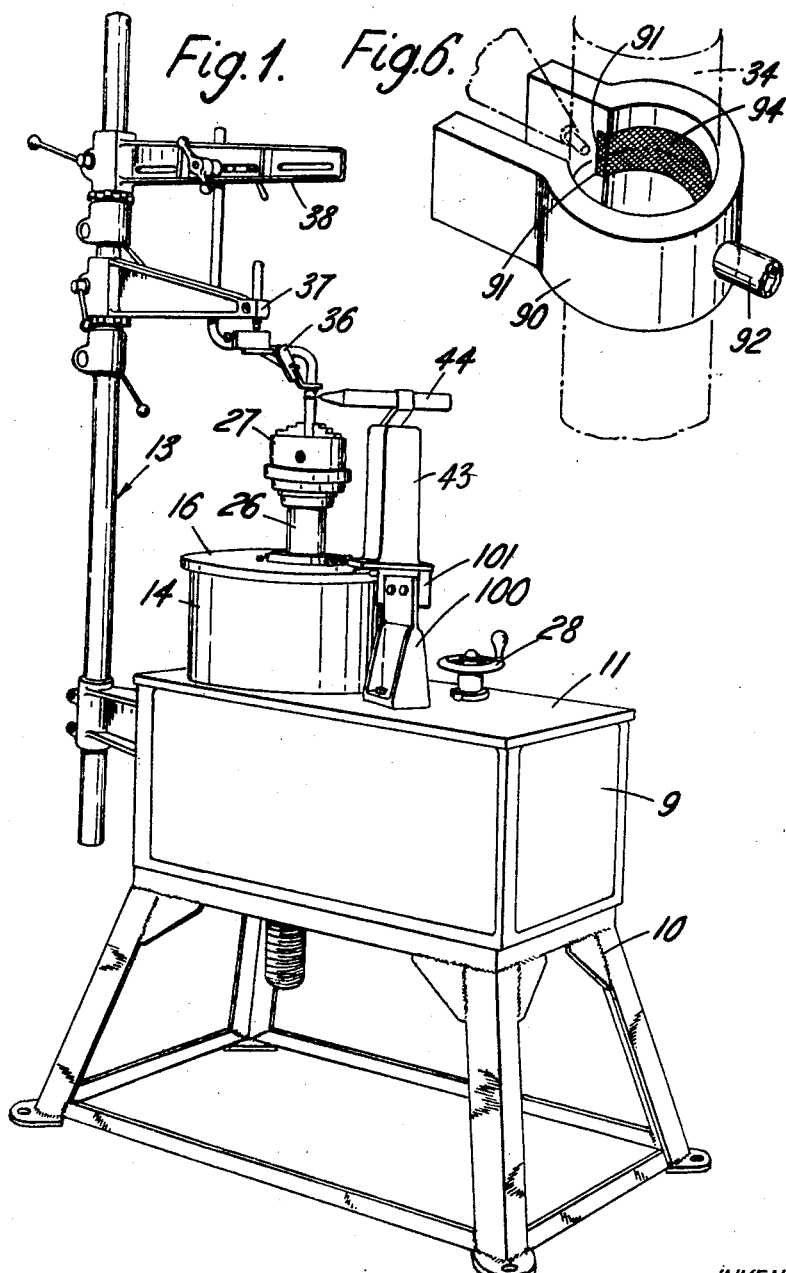

July 20, 1965 T. H. COOPER ET AL 3,196,248
WELDING APPARATUS

Filed Nov. 21, 1961 5 Sheets-Sheet 1

INVENTORS
THOMAS HENRY COOPER,
LAURENCE KEBLE HILL &
JAMES JOSEPH GILES

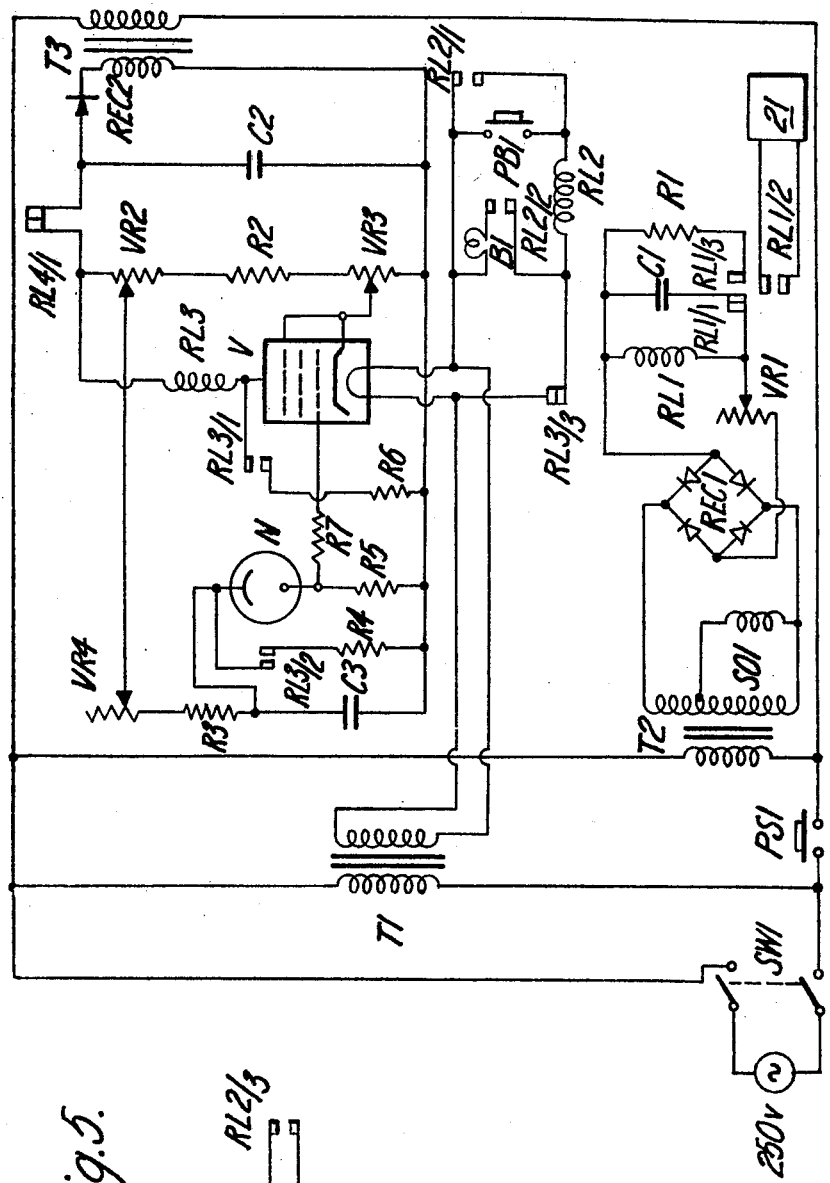
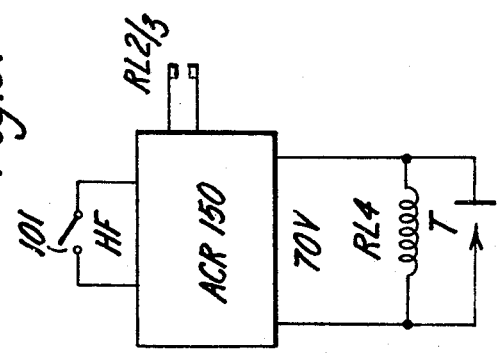
Fig.5.
INVENTORS
THOMAS HENRY COOPER,
LAURENCE KEBLE HILL &
JAMES JOSEPH GILES 3,196,248
WELDING APPARATUS
Thomas Henry Cooper, Laurence Keble Hill, and James Joseph Giles, London, England, assignors to BTR Industries Limited, London, England, a British company
Filed Nov. 21, 1961, Ser. No. 153,983
Claims priority, application Great Britain, Nov. 23, 1960, 40,309/60
3 Claims. (Cl. 219—125)

The invention relates to welding apparatus of the kind using an electric arc shielded by an inert gas such as argon and to a method of welding. It is an object of the invention to provide such apparatus and method which may be used to weld around a work-piece, for example to weld a seam, in a horizontal plane, between the end of a stainless steel pipe and an end fitting to be attached to the pipe, or to weld a seam between two pipe lengths.

The invention provides a machine for use in welding around a work-piece and comprising a non-rotating work holder, a welding torch holder, a support for the torch holder mounted for rotation around a work-piece held by the work holder, conduits for supplying electricity and a shielding gas from a fixed (i.e., non-rotating) supply to the torch, said conduits each incorporating a sliding annular joint around the axis of rotation of the torch holder and permitting said rotation of the holder.

Such a machine is particularly suitable for welding stainless steel, but may also be applied to titanium, tantalum, aluminium, bronze and brasses.

Preferably the machine includes a conduit with a joint as aforesaid, for supply of coolant (e.g., water) to the torch and there may also be a return conduit for the coolant.

When there is a conduit for a coolant, as just described, the conduit for the supply of electricity to the torch may comprise a cable within the coolant conduit, preferably a return conduit.

The joint in a conduit for the shielding gas or coolant liquid may comprise in one joint part an annular groove around the axis of rotation with an opening into the groove and a port in the other joint part opening into the groove, sealing means being provided on each side of the groove.

The machine may also include a supply pipe for shielding gas leading to an outlet positioned to be within the work-piece (e.g., in the region of a seam to be welded). The outlet orifice may be composed of porous sintered material. The work holder may be tubular and the said supply pipe may pass through the holder.

One construction of the machine, described in more detail later, includes gas and electricity supplies, a motor for rotating the torch holder and means for effecting automatically, after a manual starting operation, the following sequence of steps, first a purge by shielding gas of the gas conduit or conduits, then starting of the torch rotation, then initiation of the arc followed by rotation of the torch holder for a predetermined time, termination of the arc with continued rotation for a further predetermined time of the torch and continued supply of gas and finally stopping of the torch rotation and of the gas supply.

The invention also provides the method of welding together two tubular parts in end to end relation which comprises rotating an electric welding torch around the outside of the joint to be welded for a predetermined time and at a constant speed, and supplying a shielding gas to the weld region.

It is preferred to use as a filler for a weld seam, an integral part of the work, the part being suitably formed as later described.

Figure 2:
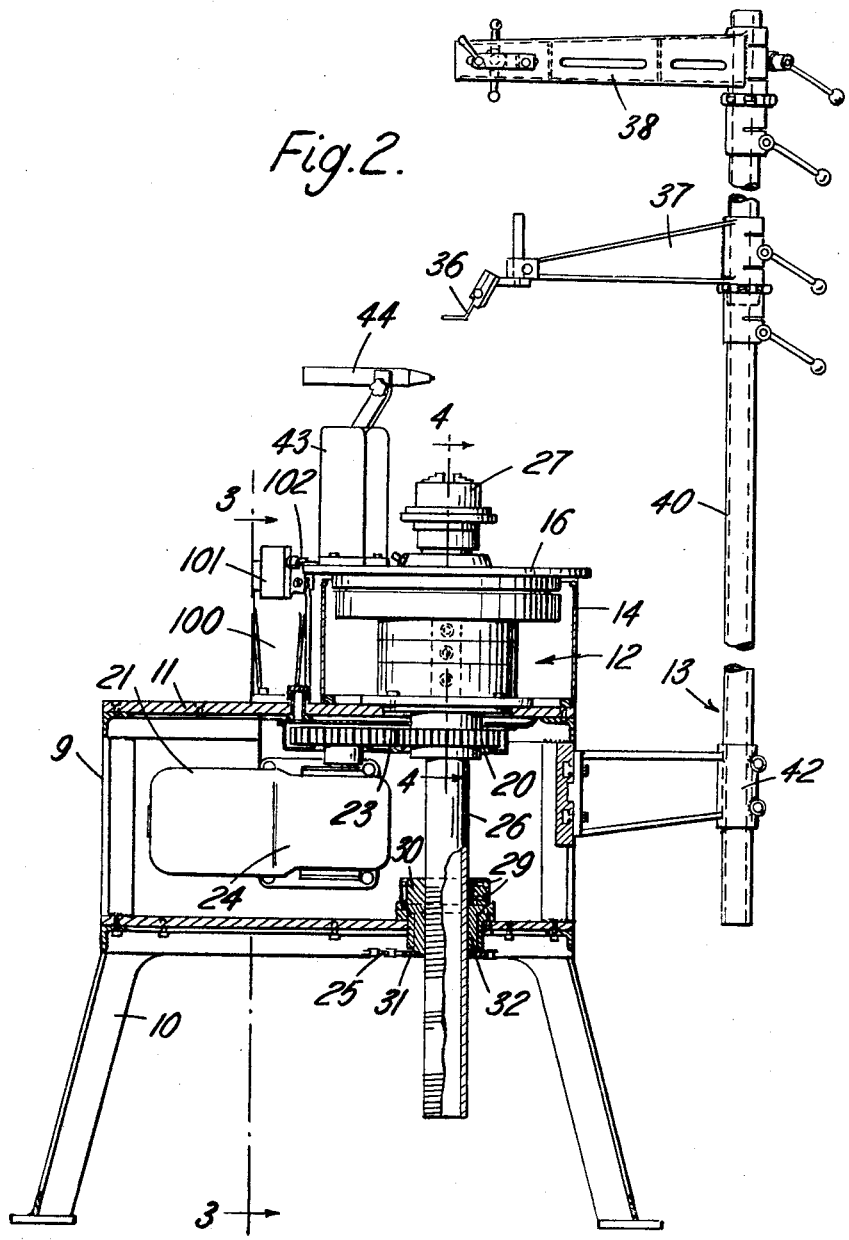
Figure 3:
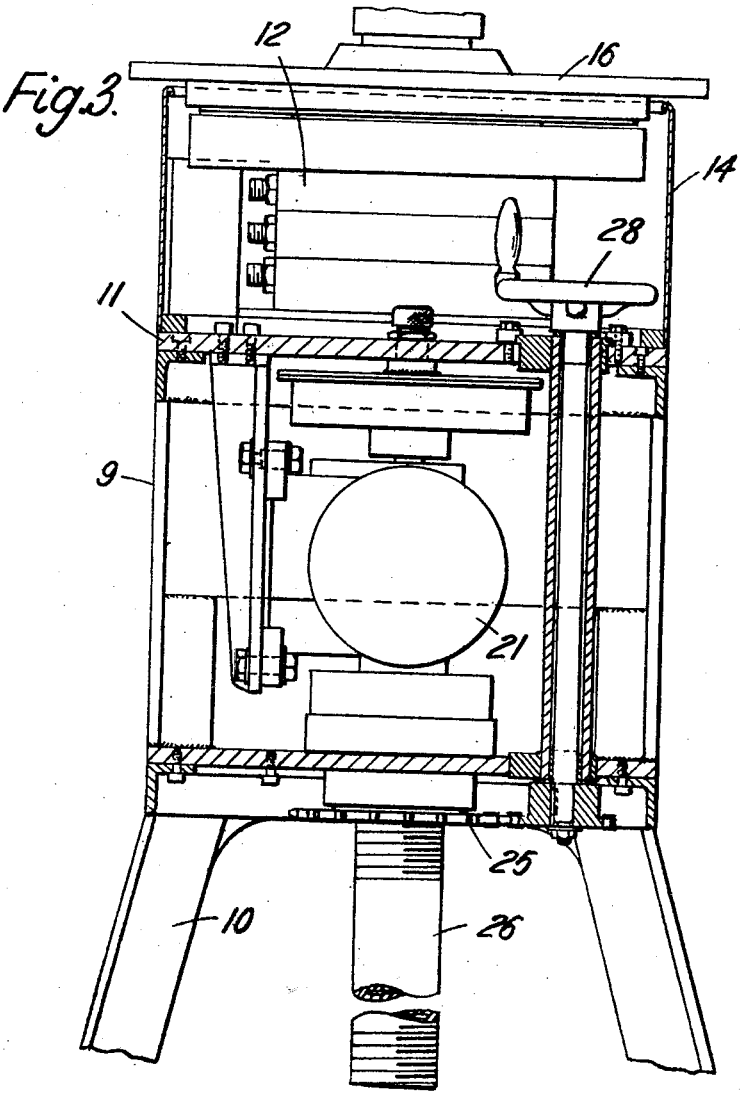
Figure 4:
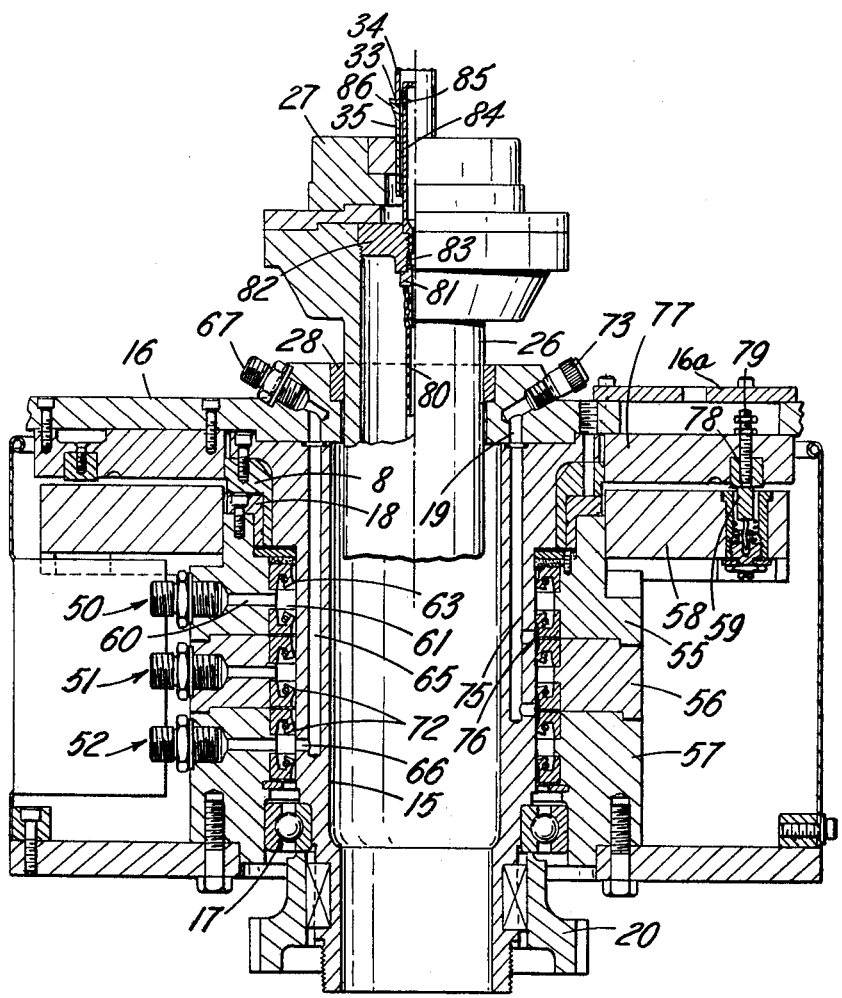

A specific construction of a welding apparatus according to the invention will now be described, with reference to the accompanying drawings, in which:

FIGURE 1 is a perspective view of the apparatus,
FIGURE 2 is a sectional side view of the apparatus,
FIGURE 3 is a section on the line 3—3 of FIGURE 2,
FIGURE 4 is an enlarged sectional view on the line 4—4 in FIGURE 2,
FIGURE 5 shows the automatic timing circuit for the apparatus, and
FIGURE 6 is a view of a welding shield which fits around the joint to be welded.

The welding apparatus in this example is designed to weld a seam between a bent pipe (e.g., of stainless steel, aluminium, or titanium) and an end fitting or union member to be attached to the pipe or to weld two such pipes together. A general view of the apparatus is shown in FIGURE 1.

The operating parts of the welding apparatus are all mounted on a stand 10 which supports a rectangular box 9 having a table top 11 supporting a cylindrical housing 12 surrounded by a guard 14. At the end of the box adjacent the guard there is a work support pillar 13.

Fitting into a central bore in the housing and continuing through a hole in the table top there is the stem 15 of a rotatable torch holder which has a circular top plate 16 attached to the top of the stem. The stem 15 of the torch holder is mounted in a thrust race 17 at the base of the housing and has a bearing sleeve and which works in a bush 18 at the top of the housing. The upper bearing is lubricated through a grease passageway 19. The stem 15 of the torch holder projects below the table top and a gear wheel 20 is mounted on the projection so formed. The gear wheel 20 and hence the torch holder is driven by a motor 21 through a slip clutch, a gearbox 24 and a driving gear 23 all of which are housed in the box 9.

Internally concentric within the hollow stem 15 of the torch holder and projecting through a central hole in the top plate of the torch holder there is a tubular non-rotating work-holding column 26 to which the work is held by a chuck 27 fastened to the top end of the column. The column 26 is mounted at its upper end in an annular bush 28 fitted to the top plate of the torch holder and at its lower end in a bearing 30 fixed to the stand and beneath the table top.

The work-holding column 26 is axially slidable in its bearings and movement is effected by turning a handwheel 28 which drives a chain 25 connected to a cog 31 fixed to a nut 32. The nut 32 is held axially in the lower mounting 30 of the work holding column and is threaded onto the work holding column which is held against rotation by bolts 29 entering a keyway in the side of the column. Rotation of the nut 32 raises and lowers the column.

A pipe fitting 35, to be welded is held in position by the chuck 27 at the top of the work holding column and a pipe 34, which enters into a socket 33 in the fitting 35, as shown in FIGURE 4, is supported by a clamp on a support arm 38 and a work centraliser on a support arm 37 which arms are adjustably mounted on the work support pillar 13. Alternatively the arm 37 may be mounted on the top plate 16. The work centraliser 36 comprises a clamp held in a universal joint in the arm 37.

The work support pillar 13 comprises a central rod-shaped member 40 which is held in a hollow cylindrical base member 42 which is fixed to the box 9.

The welding torch 44 (which is a conventional water cooled argon arc welding torch) is mounted on a pillar 43 on the top plate 16 of the torch holder. This mounting is arranged so that a fine adjustment may be effected to the torch in a vertical and/or horizontal plane.

There may be an additional pillar on the top plate 16 and carrying a welding shield which fits around the joint to be welded. This shield is shown diagrammatically in FIGURE 6 and comprises a horseshoe-shaped body 90 which fits around the joint. There is a channel 91 around the inside of the body and an argon supply pipe 92 leading to the channel. The mouth of the channel is curved by a fine mesh gauge. The welding torch has access to the joint between the arms of the horseshoe. There would be a series of different diameter shields to fit pipes to be welded of different diameter.

The supply of argon and cooling water to the torch (and the welding shield if used) will now be described.

There are three supply pipes leading to the housing from external sources: an argon supply pipe 50, a water supply pipe 51, and a water return pipe 52. The body member 12 is divided horizontally into three sections 55, 56, 57 and the three supply pipes are each joined to the side of one of these sections by a union. The arrangement of the supply pipes is in the order, reading from top to bottom of the housing, of argon supply 50, water supply 51 and water return 52.

From each union a horizontal bore 60 in the housing leads through to an annular groove 61 in the inner circumference of the housing and adjacent to the rotatable torch-holder 15. Around the edges of each annular groove there are spring-loaded rubber seals 63 which seal the housing to the sleeve.

Each supply is connected between its annular groove 61 and the welding torch 44 by a throughway 65 connecting a port 66, in the stem 15 of the torch-holder and which stem is open to the annular groove with a banjo union 67 mounted in the top-plate and connected by a pipe to the torch. Only one set of connections is seen in FIGURE 4 as the throughways 65 are located around the circumference of the torch holder.

Each of the rubber seals 63 has two annular lips 72 which bear on the stem 15 and is lubricated through a nipple 73 in the top plate 16 of the torch holder which leads through a drilling 75 in the stem to an opening 76 between the lips of the seal.

The supply of electricity to the torch will now be described.

There is a lower ring 58 of insulating material supported on the upper portion 55 of the housing and this lower ring 58 carries a spring loaded brush 59 connected to the welding supply for the torch (which will be described later).

There is an upper ring 77 of insulating material bolted to the underside of the top plate 16 which upper ring rotates with the top plate. The upper ring carries a slip ring 78 which co-operates with the brush 59 on the lower ring 58. The slip ring is connected through a connection 79 and an electrical lead to the torch. Dirt and dust are excluded from the connection 79 by a cover plate 16a on the top plate 16.

There is a mounting bracket 100 on the table top 11 and this bracket carries a microswitch assembly 101 which is operated by a cam 102 on the rotating table 16.

There is a further supply of shielding gases (a mixture of argon with up to 2% nitrogen, helium or hydrogen) through a flexible pipe 80 in the bore of the work holding column which is fastened to a tubular metal end-piece 81 screwed into a threaded hole 83 at the centre of a plate 82 screwed into the column 26. An adaptor 84 is screwed into the hole 83 from above the plate 82. The adaptor is in the form of a tube which is closed at its upper end, which slides inside the end fitting and pipe to be welded, and has small outlet holes 85 for the shielding gas above and below the seam to be welded. Alternatively the adaptor may terminate in a plug of sintered material adjacent the seam through which material the gas is diffused. There will be a set of such adaptors with different lengths and diameters for different end fittings and pipes. Where the shape of the work-piece does not allow for the insertion of any such adaptor, the adaptor is omitted, allowing for free flow of shielding gas.

The fitting 35 to be welded to the pipe 34 has a socket 33 into which the end of the pipe is fitted and has, integral with and around the socket mouth, an external projection or rib 86 of metal to provide a weld filling. The rib of which the greater part is originally above the actual joint, may be of rectangular section or as shown, the external circumferential face may taper away from the tube (i.e., downwardly, so that the lower diameter is smaller than the upper) because welding takes place with the seam horizontal and the fitting below the pipe. Thus the filler metal will tend to run downwards when molten and provide a uniform thickness of weld.

The torch is supplied from an ACR 150 welding unit (made by the British Oxygen Company Limited) which embodies a conventional tungsten inert gas rectifier and controls for the electrical supply and gas flow to the torch.

The ACR 150 welding unit supplies 70 v. to the arc and the arc strikes when a high frequency supply is superimposed on the 70 v. When the arc strikes the voltage across the arc drops to about 10 v.

The welding time is governed by a timer which forms part of the circuit of FIGURE 5 which will be described later.

When the welding operation stops, the welding unit carries out the following sequence while the torch holder is still rotating:

(1) A crater filler comes into operation for a timed period.

(2) The crater filler stops and a gas delay timer comes into operation so that the weld is still surrounded by shielding gas for a period.

(3) The gas supply is switched off.

The sequence of operation of the apparatus will now be described.

First of all an adaptor 84 is screwed into place and the pipe and fitting to be welded together are clamped into place using the chuck 27, the work centraliser 26 and the clamp on the support arm 38.

The welding sequence is carried out in conjunction with the ACR 150 by an automatic control unit the essential parts of which are shown in FIGURE 5.

The water supply is turned on and the welding unit is switched on. The closing of SW1 by the operator supplies 250 v. A.C. to transformer T1 which supplies 6.3 v. to the heater of a pentode valve V.

On depressing a push button PB1 a relay RL2, which is fed from transformer T1, is energised (since contacts RL3/3 are closed when there is no current in relay RL3) and relay RL2 closes contacts RL2/1, RL2/2 and RL2/3. The energising current for relay RL2 is now supplied through contacts RL2/1 and on the release of the push button PB1 by the operator the relay RL2 is self-holding.

Contacts RL2/2 supply current to the bulb B1 which lights indicating that the control sequence has started.

Contacts RL2/3 close the circuit to the contacts in the ACR 150 which:

(i) operates a solenoid opening a cock to supply shielding gas to the electric arc T (and the welding shield 90 if used)

(ii) supplies 70 v. to RL4 and the arc T (iii) initiates (but does not complete the circuit to) the high frequency arc-starting supply to the arc T.

A small percentage of shielding gas by-passes the torch and operates a pressure switch PS1 thus energising transformers T2 and T3. A solenoid SO1 is energised by a 25 v. tapping from transformer T2 and the solenoid operates a valve to supply shielding gas to the flexible pipe 80 in the work holding column and hence to the adaptor and the workpiece.

A 50 v. tapping on transformer T2 is rectified by a bridge rectifier REC1 and commences to charge capacitor C1 via a variable resistance VR1 (contacts RL1/1 are normally closed). When C1 is charged (the time delay being variable by altering the value of resistance VR1) relay RL1 is energised closing contacts RL1/3 and RL1/2. The closing of contacts RL1/3 opens contacts RL1/1.

Contacts RL1/2 complete the circuit to the electric motor 21 to start the motor and set the torch holder rotating. Thus the time during which the system is purged by the gas before the torch holder moves is controlled by the time taken to charge the capacitor C1 (the purge time is usually about 30 seconds).

Contacts RL4/1 of relay RL4 are normally closed but relay RL4 is in the 70 v. circuit of the ACR 150 to the arc and is energised to open contacts RL4/1 when contacts RL2/3 are closed. As this action is almost simultaneous with the closing of pressure switch PS1, no power is supplied from transformer T3.

When the torch holder and top plate have rotated to a predetermined position the cam operated microswitch assembly 101 on the table completes the HF supply circuit from the ACR 150 to the welding arc. When the arc strikes the voltage across the torch and hence across the relay RL4 drops from 70 v. to about 10 v. closing contacts RL4/1 and completing the circuit from transformer T3 to the weld timing circuit which will now be described.

Current is provided to the capacitor C3 from a potential divider network consisting of a resistance R2 and two variable resistances VR2 and VR3 in parallel with a smoothing capacitor C2 and in series with a rectifier REC2. The current reaches capacitor C3 through a resistance R3 and a variable resistance VR4. When the voltage across C3 has risen to approximately 150 v. the voltage regulator tube N strikes introducing a negative grid bias to the control grid of the valve V. The valve V conducts and energises a relay RL3 opening contacts RL3/3 and closing contacts RL3/1 and RL3/2. As voltage is now supplied to RL3 directly through resistance R6 and contacts RL3/1, relay RL3 becomes self-holding, while contacts RL3/2 short out capacitor C3 through resistance R4.

The opening of contacts RL3/3 de-energises the relay RL2 thus opening contacts RL2/1, RL2/2 and RL2/3. The opening of contacts RL2/3 initiates the following sequence in the ACR 150 (the torch holder continues to rotate as contacts RL1/2 are still closed):

(i) the crater filler comes into operation for a preset period, (ii) the crater filler stops and a shielding gas delay circuit comes into operation for a preset period, (iii) the shielding gas supply is cut off.

The fall in pressure when the shielding gas ceases to flow opens the switch PS1, de-energising the transformers T2 and T3. Thus the contacts RL1/2 are opened stopping the electric motor 21.

The operation is now completed as all the contacts revert to their normal positions until switch PB1 is again depressed prior to the next welding operation.

It will be appreciated that the angle through which the torch turns while the weld is actually taking place is variable by alternative of the time taken to charge the capacitor C3 (i.e., by changing the values of the two variable resistances VR2 and VR4.) The torch will usually turn through just more than 720°.

There are three controls in the apparatus which must be preset before welding commences. These are:

(1) The motor speed by altering the resistance of the motor armature circuit.)

(2) The argon purge time (by altering VR1).

(3) The welding time (by altering VR4 or VR2).

The important advantage of an automatic welding operation is that once the three above controls have been preset, the machine will produce any desired number of identical welds. This consistency and reliability cannot be produced even by a very experienced manual welder.

The chuck may be spring loaded so that an axial load may be applied to the work-pieces during the operation of the apparatus.

We claim:

1. A machine for welding around the outside of an elongated workpiece comprising
   (a) a non-rotatable housing with a central bore
   (b) a torch support having a tubular stem mounted for rotating coaxially within the bore of the housing
   (c) means for effecting rotation of the support
   (d) a non-rotatable tubular work holder mounted coaxially within the stem of the torch support
   (e) means on the work holder for holding an elongated workpiece coaxially with the holder
   (f) means on the torch support for mounting a welding torch for rotation on the support about the work holder
   (g) the torch support having conduits and wires for feeding shielding gas, coolant liquid and welding current respectively to a torch
   (h) the housing having conduits and wires for supplying coolant liquid, shielding gas and welding current respectively and
   (i) sliding annular joints between the housing and the torch support connecting the conduits and wires in the housing with the corresponding conduits and wires in the torch support, while permitting rotation of the torch support.

2. A welding machine as claimed in claim 1 and including means for holding a second workpiece adjacent the said elongated workpiece for welding thereto.

3. A welding machine as claimed in claim 1 in which the tubular work holder is mounted for axial adjustment within the stem of the torch support.

References Cited by the Examiner

UNITED STATES PATENTS

| | | | |
|---|---|---|---|
| 2,721,248 | 10/55 | Kirkpatrick | 219—125 |
| 2,777,937 | 1/57 | Bryant | 219—125 |
| 2,817,745 | 12/57 | Pilia et al. | 219—125 |
| 2,844,707 | 7/58 | Mazzagatti | 219—74 |
| 2,906,852 | 9/59 | Cornell et al. | 219—61 |
| 2,996,600 | 8/61 | Gardner et al. | 219—61 |
| 3,068,343 | 12/62 | Rossner | 219—60 |
| 3,084,243 | 4/63 | Gotch | 219—60 |
| 3,134,894 | 5/64 | Farnsworth | 219—125 |

RICHARD M. WOOD, *Primary Examiner.*

JOSEPH V. TRUHE, *Examiner.*